United States Patent
Crothers et al.

(10) Patent No.: US 10,018,071 B2
(45) Date of Patent: Jul. 10, 2018

(54) SYSTEM FOR DETECTING ANOMALIES IN GAS TURBINES USING AUDIO OUTPUT

(71) Applicant: General Electric Company, Schenectady, NY (US)

(72) Inventors: Sarah Lori Crothers, Greenville, SC (US); Paige Marie Sopcic, Greenville, SC (US); Jason Dean Fuller, Greenville, SC (US); Daniel Joseph Flavin, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/284,745

(22) Filed: Oct. 4, 2016

(65) Prior Publication Data

US 2018/0094536 A1    Apr. 5, 2018

(51) Int. Cl.
  *F01D 21/00*    (2006.01)
  *G01M 15/14*    (2006.01)
  *G05B 23/02*    (2006.01)

(52) U.S. Cl.
  CPC ........... *F01D 21/003* (2013.01); *G01M 15/14* (2013.01); *G05B 23/0216* (2013.01); *F05D 2220/30* (2013.01); *F05D 2240/24* (2013.01); *F05D 2240/35* (2013.01); *F05D 2270/804* (2013.01); *F05D 2270/807* (2013.01); *F05D 2270/808* (2013.01); *F05D 2270/81* (2013.01)

(58) Field of Classification Search
  CPC ...... F01D 21/003; F01D 17/085; F01D 21/12; F15B 2201/205; F02D 2041/285; F02D 2200/025; F02M 31/08
  See application file for complete search history.

(56) References Cited

U.S. PATENT DOCUMENTS

| | | | |
|---|---|---|---|
| 4,543,830 A | 10/1985 | Stephens | |
| 5,371,854 A | 12/1994 | Kramer | |
| 6,257,366 B1* | 7/2001 | Gerretsen | F02K 1/44 181/213 |
| 2012/0131901 A1* | 5/2012 | Westervelt | F02C 9/266 60/204 |

(Continued)

FOREIGN PATENT DOCUMENTS

| | | |
|---|---|---|
| EP | 0 666 542 A2 | 8/1995 |
| EP | 3 258 067 A1 | 12/2017 |

OTHER PUBLICATIONS

Hearst, M. A., "Dissonance on audio interfaces," IEEE Expert, vol. 12, Issue 5, pp. 10-16 (1997).

(Continued)

*Primary Examiner* — Kabir A Timory
(74) *Attorney, Agent, or Firm* — Ernest G. Cusick; Frank A. Landgraff

(57) ABSTRACT

In one embodiment, a turbine system includes a number of sensors, each of the number of sensors disposed in a respective location of the turbine system, and a controller including a memory storing one or more processor-executable routines and a processor. The processor configured to access and execute the one or more routines encoded by the memory wherein the one or more routines, when executed cause the processor to receive one or more signals from the number of sensors during any stage of operation of the turbine system, and convert the one or more signals to audio output.

18 Claims, 4 Drawing Sheets

(56) References Cited

U.S. PATENT DOCUMENTS

| | | |
|---|---|---|
| 2015/0051847 A1 | 2/2015 | Angello et al. |
| 2015/0168228 A1* | 6/2015 | DeSilva ................ G01K 11/22 374/119 |
| 2015/0186483 A1* | 7/2015 | Tappan ................ G06F 3/0481 707/737 |

OTHER PUBLICATIONS

Johannsen, G., "Auditory Displays in Human-Machine Interfaces," Proceedings of the IEEE, vol. 92, No. 4, pp. 742-758 (Apr. 2004).
Extended European Search Report and Opinion issued in connection with corresponding EP Application No. 17194389.7 dated Feb. 16, 2018.

* cited by examiner

SYSTEM FOR DETECTING ANOMALIES IN GAS TURBINES USING AUDIO OUTPUT

BACKGROUND

The subject matter disclosed herein relates to turbomachinery, and more specifically, to detecting anomalies, events, or problems in gas turbines using audio output.

Plant operators may be removed from the physical noises of the equipment (e.g., gas turbines) in plants as the equipment is running. For example, the operator may be monitoring the operation of the plant at a location remote from the plant, sound-proofing of the equipment operating in the plants may reduce the audible noise emitted, or the like. As such, the operators oftentimes rely on alarms created by a control system to protect the equipment. However, operators may become desensitized to or ignore the alarms for significant periods of time, which may lead to an undesirable operating condition of the equipment occurring.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In one embodiment, a turbine system includes a number of sensors, each of the number of sensors disposed in a respective location of the turbine system, and a controller including a memory storing one or more processor-executable routines and a processor. The processor configured to access and execute the one or more routines encoded by the memory wherein the one or more routines, when executed cause the processor to receive one or more signals from the number of sensors during any stage of operation of the turbine system, and convert the one or more signals to audio output.

In one embodiment, a controller includes a memory storing one or more processor-executable routines, and a processor configured to access and execute the one or more routines encoded by the memory wherein the one or more routines, when executed cause the processor to receive one or more signals from a number of sensors during any stage of operation of a turbine system, wherein each of the number of sensors are disposed in a respective location of the turbine system, and convert the one or more signals to audio output.

In one embodiment, one or more tangible, non-transitory computer-readable mediums includes instructions that, when executed by one or more processors, cause the one or more processors to receive one or more signals from a number of sensors during any stage of operation of a turbine system, wherein each of the number of sensors are disposed at a respective location of the turbine system, and wherein the signals are indicative of dynamic pressure inside each respective location, and convert the one or more signals to audio output.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein.

DETAILED DESCRIPTION

Figure 1:
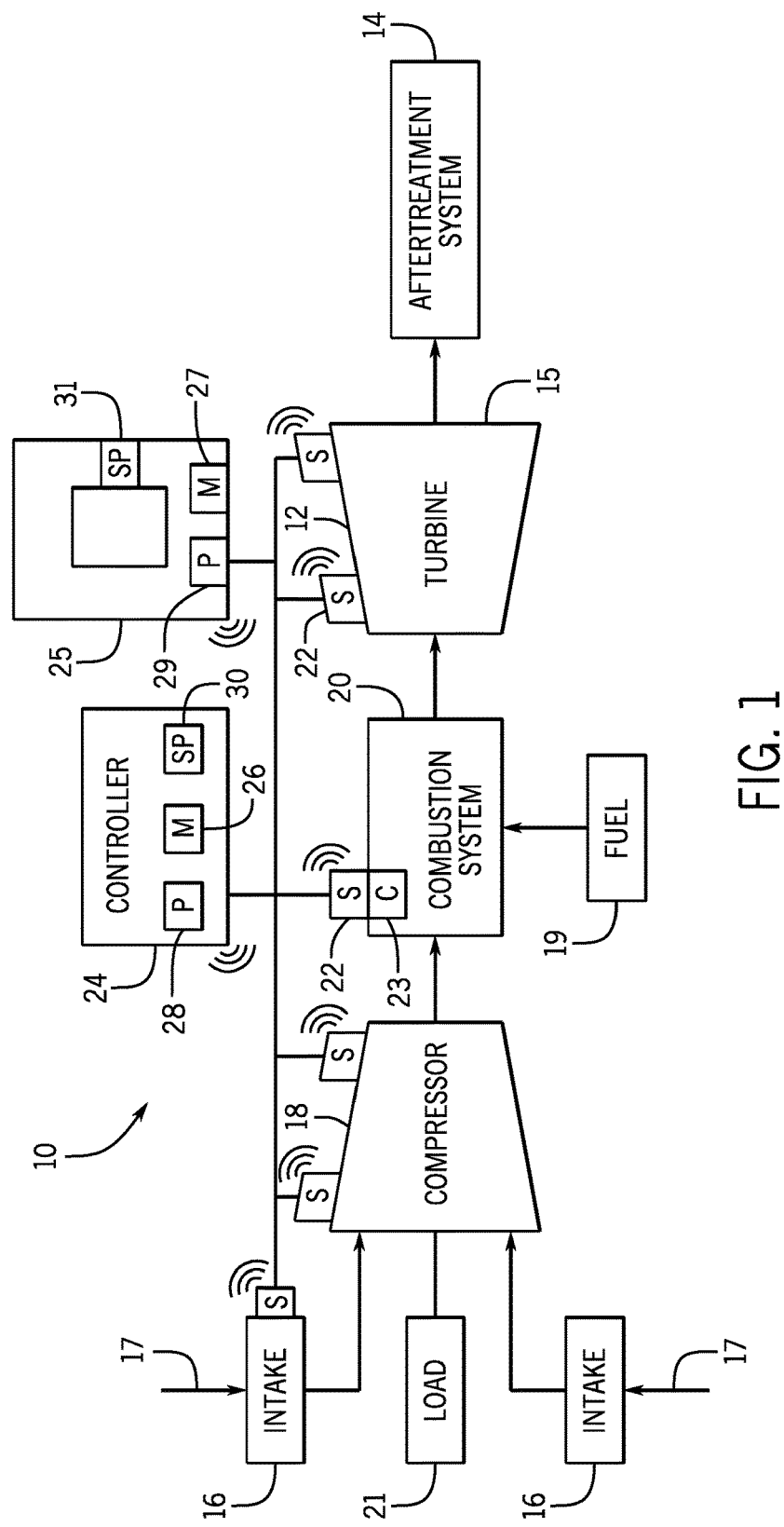
FIG. 1 is a block diagram of a turbine system that enables detection of anomalies, events, or problems via audio output using one or more sensors, in accordance with an embodiment.

One or more specific embodiments of the present subject matter will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements.

As previously discussed, plant operators may ignore or become desensitized to certain alarms related to gas turbine health that are emitted at control stations remote from the plant. As such, gas turbine equipment issues may arise at the plants that result in significant equipment downtime (e.g., the equipment is not operational) or maintenance costs. Thus, it is now generally recognized that improved techniques for detecting gas turbine anomalies, events, or problems are desirable.

Accordingly, embodiments of the present disclosure generally relate to a system and method for detecting gas turbine anomalies, events, or problems while the turbine system is operational using audio output. That is, some embodiments enable gas turbine operators to monitor potential anomalies, events, or problems via audible noise obtained from sensors included in or attached to the turbine system. The sensors may obtain the data during any period of operation (e.g., startup, full operation, and/or shutdown) of the turbine system. As described below, the sensors may be any type of sensor suitable for producing audio, and the sensors may be placed in any suitable location where the operator desires to listen. For example, the sensors may include combustion dynamics pressure sensors that are already present in the combustion system of the gas turbine. Leveraging the existing combustion dynamics pressure sensors may reduce new instrumentation and installation costs. Additionally, the sensors may include clearance probes, optical probes, microphones, accelerometers or strain gages, dynamic pressure sensors, and the like. The sensors may be located anywhere on the gas turbine or within the gas turbine, such as in an inlet, compressor, turbine, holes of a casing of the turbine system, borescope ports, or the like. In some embodiments, the sensors may emit signals to a controller and/or computing device executing a software application. The software application may cause a processor to convert the signals into audio signals and output the audio signals via audio output devices of the controller and/or computing device. The plant operators may listen to the combustion system and detect anomalies, events, or problems based on a change in the sound of the turbine system, rather than solely relying on controller alarms. The anomalies, events, or problems may include flutter, rotating stall, whistling caused by resonance of the compressor bleed cavities and/or various cavities or wheel spaces in the turbine, items (e.g., bolts, debris, etc.) left inside the turbine system when the system is operational, and the like.

Turning now to the drawings, FIG. 1 illustrates a block diagram of a turbine system 10 that enables detection of anomalies, events, or problems via audio output, in accordance with an embodiment of the present disclosure. The turbine system 10 includes a turbine engine 12 and an aftertreatment system 14. In certain embodiments, the turbine system 10 may be a power generation system. The turbine system 10 may use liquid or gas fuel, such as natural gas and/or a hydrogen-rich synthetic gas, to run the turbine system 10. As shown, the turbine system 10 includes an air intake section 16, a compressor 18, a combustion system 20, and the turbine 12. The turbine 12 may be drivingly coupled to the compressor 18 via a shaft. In operation, air enters the turbine system 10 through the air intake section 16 (indicated by the arrows 17) and is pressurized in the compressor 18. The intake section 16 may include an inlet. The compressor 18 may include a number of compressor blades coupled to the shaft. The rotation of the shaft causes rotation of the compressor blades, thereby drawing air into the compressor 18 and compressing the air prior to entry into the combustion system 20.

As compressed air exits the compressor 18 and enters the combustion system 20, the compressed air 17 may be mixed with fuel 19 for combustion within one or more combustion cans 23. For example, the combustion cans 23 may include one or more fuel nozzles that may inject a fuel-air mixture into the combustion cans 23 in a suitable ratio for optimal combustion, emissions, fuel consumption, power output, and so forth. The combustion of the air 17 and fuel 19 generates hot pressurized exhaust gases, which may then be utilized to drive one or more turbine blades within the turbine 12. In operation, the combustion gases flowing into and through the turbine 12 flow against and between the turbine blades, thereby driving the turbine blades and, thus, the shaft into rotation to drive a load 21, such as an electrical generator in a power plant. As discussed above, the rotation of the shaft also causes blades within the compressor 18 to draw in and pressurize the air received by the intake 16.

The combustion gases that flow through the turbine 12 may exit the downstream end 15 of the turbine 12 as a stream of exhaust gas. The exhaust gas stream may continue to flow in the downstream direction towards the aftertreatment system 14. For instance, the downstream end 15 may be fluidly coupled to the aftertreatment system 14. As a result of the combustion process, the exhaust gas may include certain byproducts, such as nitrogen oxides ($NO_x$), sulfur oxides ($SO_x$), carbon oxides ($CO_x$), and unburned hydrocarbons. Due to certain regulations, the aftertreatment system 14 may be employed to reduce or substantially minimize the concentration of such byproducts prior to releasing the exhaust gas stream into the atmosphere.

One or more sensors 22 may be included in the combustion system 20, the compressor 18, the turbine 12, various holes in a casing of the turbine system 10, borescope ports, inlets of the intake section 16, or any suitable location of the turbine system 10 from which an operator desires to listen to noises to detect an anomaly, event, or problem. In some embodiments, the sensors 22 may include any type of dynamic pressure sensors, accelerometers, strain gages, or the like. For example, the sensors 22 may be bearing seismic sensors (e.g., accelerometers) or rotor proximity probes that are configured to listen to rotor dynamics to enable detecting tonal or discrete frequency. In some embodiments, the sensors 22 may be located over a particular blade stage in the compressor 18 and/or the turbine 12 to enable detecting anomalous behavior like flutter, stall, whistles, or the like due to cavities in the compressor 18 and/or the turbine 12. For example, the sensors 22 may be dynamic pressure sensors that are located in a flow path, or the sensors 22 may be accelerometers located on the casing of the compressor 18 and/or the turbine 12. In some embodiments, the sensors 22 may already be included in the assembled combustion system 20 and no other instrumentation may be added to the combustion system 20 to perform certain embodiments of the present disclosure. In some embodiments, the sensors 22 may be configured to sense pressure signals or waves in any desirable amplitude and frequency range within the compressor 18, the combustion system 20, and/or the turbine 12.

The sensors 22 may include piezoelectric materials that generate electric signals resulting from pressure. In some embodiments, the sensors 22 may include Micro-Electrico-Mechanical Systems (MEMS) sensors, Hall effect sensors, magnetorestrictive sensors, or any other sensor designed to sense vibration, pressure, or the like. Additionally, the sensors 22 may include optical sensors that are configured to measure combustion dynamics optically. The sensors 22 may include communication circuitry that enables the sensors 22 to be communicatively coupled to a controller 24 and/or a computing device 25 via a wireless (e.g., Bluetooth® Low Energy, ZigBee®, WiFi®) or wired connection (e.g., Ethernet). In some embodiments, the computing device 25 may include a laptop, a smartphone, a tablet, a personal computer, a human-machine interface, or the like.

In some embodiments, the sensors 22 may include a microphone or array of microphones included in the combustion system 20 and/or disposed in portions of the turbine system 10 external to the combustion system 20. For example, the microphones or array of microphones may be disposed within or near the inlet, the exhaust stack, the compressor 18, the turbine 12, or the like. In some embodiments, the microphone or array of microphones may send detected sound indicative to the controller 24 for use in a sound level meter or series of sound level meters. In some embodiments the detected sound may be indicative of combustion dynamics.

During operation, the sensors 22 may transmit signals indicative of pressure (e.g., static, dynamic) or vibration to the controller 24 and/or the computing device 25. The sensors 22 may transmit signals during any stage of operation (e.g., startup, combustion at full speed operation, shutdown) of the turbine system 10. In some embodiments, the sensors 22 may be active and transmit signals of any detected noise even when the turbine system 10 is shutdown. The controller 24 and/or the computing device 25 may receive the signals from the sensors 22 and convert the signals into audio signals suitable for outputting (e.g., via an audio output device associated with the computing device 25). As such, the controller 24 and/or the computing device 25 may each include one or more tangible, non-transitory computer-readable mediums (e.g., memories 26 and 27) storing computer instructions that, when executed by a respective processor 28 and 29 of the controller 24 and/or the computing device 25, cause the processor 28 and 29 to receive the signals, convert the signals to audio signals, and output the audio signals via a respective audio output device 30 and 31 (e.g., speaker, bullhorn, megaphone, siren, headphone, amplifier, public address (PA) system, etc.). It should be noted that non-transitory merely indicates that the media is tangible and not a signal. Further, the controller 24 and/or the computing device 25 may include communication circuitry, such as a network interface, that is configured to receive the signals and transmit the signals to the processors 28 and 29.

The processors 28 and 29 may be any type of computer processor or microprocessor capable of executing computer-executable code. Moreover, the processors 28 and 29 may include multiple processors or microprocessors, one or more "general-purpose" processors or microprocessors, one or more special-purpose processors or microprocessors, and/or one or more application specific integrated circuits (ASICS), or some combination thereof. For example, the processor 28 may include one or more reduced instruction set (RISC) processors.

The memories 26 and 27 may be any suitable articles of manufacture that can serve as media to store processor-executable routines, code, data, or the like. These articles of manufacture may represent computer-readable media (e.g., any suitable form of memory or storage) that may store the processor-executable code or routines used by the respective processors 28 and 29 to perform the presently disclosed techniques. For example, the memories 26 and 27 may include volatile memory (e.g., a random access memory (RAM)), nonvolatile memory (e.g., a read-only memory (ROM)), flash memory, a hard drive, or any other suitable optical, magnetic, or solid-state storage medium, or a combination thereof. The memories 26 and 27 may also be used to store any data (e.g., recordings of the audio output for each of the sensor locations for a desired amount of time), analysis of the data, the software application, and the like.

Generally, the processors 28 and 29 may execute software applications that include a graphical user interface (GUI) that enables a user to select which sensor location (or all sensor locations) in the turbine system 10 to listen to via the audio output devices 30 and 31 of the controller 24 and/or the computing device 25. Additional features relating to the GUI are discussed below. As may be appreciated, the operator may listen to the audio representing pressure or dynamics in the selected sensor location(s) at a location remote from the actual turbine system 10 using the controller 24 and/or the computing device 25. In some embodiments, the operator may be in relative close proximity to the turbine system 10 while listening to the audio output via the controller 24 and/or the computing device 25 during any stage of operation.

Based on the audio output that is output via the audio output devices 30 and/or 31, the operator may determine that there is an anomaly, event, or problem occurring in the gas turbine system 10. Indeed, the user may pinpoint which area of the turbine system 10 (e.g., combustion can 23, compressor 18, turbine 12, inlet, etc.) is experiencing the anomaly, event, or problem by using the disclosed techniques. For example, the operator may discern that the current noise emitted from the compressor 18 during a stage of operation sounds different (e.g., abnormal) than the noise emitted from the compressor 18 during that stage of operation when the compressor 18 is operating as expected. As such, the operator may perform a preventative action, such as shut down the turbine system 10, check the compressor 18, perform maintenance on the compressor 18, perform replacement of components in the compressor 18, schedule maintenance and/or replacement, or the like.

Figure 2:
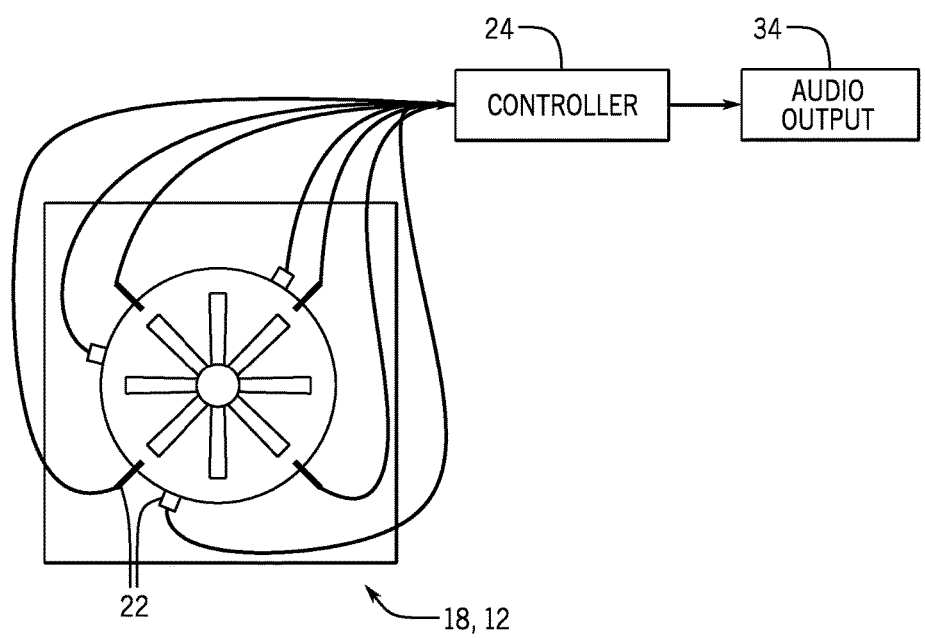
FIG. 2 is a schematic diagram of example locations of the turbine system where the sensors may be located, in accordance with an embodiment.

FIG. 2 is a schematic diagram of example locations of the turbine system 10 where the sensors 22 may be located, in accordance with an embodiment. The locations where the sensors 22 may be located include at least the compressor 18, the turbine 12, combustion cans of the combustion system 20, an inlet, various holes of a casing of the turbine system 10, a borescope port, and the like. It should be noted that in some embodiments, a combination of sensors (e.g., different axial or circumferential locations, monitoring different components of the turbine system 10) may be used to determine where anomalous behavior is originating. For example, the same tonal sound output in combustion and bearing seismic may be indicative of an anomalous event arising in the combustion system 20. As depicted, the sensors 22 may be accelerometers, dynamic pressure sensors (e.g., probes), strain gages, optical probes, or the like. Further, the sensors 22 may be located circumferentially around the turbine 12 and/or the compressor 18.

Although the signals from the sensors 22 are shown as sent to the controller 24, it should be noted that the signals may also be sent to the computing device 25, which may perform similar functionality related to converting the signals to audio and outputting the audio as the controller 24. As depicted, a respective sensor 22 may be coupled to above at least each blade stage of the turbine 12 and/or the compressor 18. Thus, if there are six blade stages in the compressor 18, then six sensors 22 may be used (e.g., one sensor 22 located proximate each blade stage). It should be noted that, in some embodiments, there may not be a one-to-one relationship between the number of sensors 22 and the number of blade stages. For example, one sensor 22 may be used to monitor all of the blade stages, a few sensors 22 may be used to monitor all of the blade stages, or more than one sensor 22 may be used to monitor a blade stage (e.g., circumferentially). Likewise, there may be numerous sensors 22 used to monitor the inlet or just a single sensor 22 may monitor the inlet.

In some embodiments, the sensors 22 may be probes that are partially inserted into the turbine 12, the compressor 18, the combustion cans of the combustion system 20, holes of a casing, borescope port, and/or inlet. The signals emitted by the sensors 22 may be sent to the controller 24 and/or the computing device 25. The controller 24 and/or the computing device 25 may include a software application that converts the signals into audio output 34 and emits the audio output 34.

It should be noted that the software application may be downloadable from an application distribution platform installed on the controller 24 and/or the computing device 25. The application distribution platform may be proprietary and private. Thus, in some embodiments, downloading of the software application that enables listening to the audio representative of the pressure or vibration of the turbine system 10 during operation or while the turbine system 10 is shutdown may be restricted to authorized users. In this way, the application distribution platform may perform authentication of the controller 24 and/or the computing device 25 that requests to download the software application.

Figure 3:
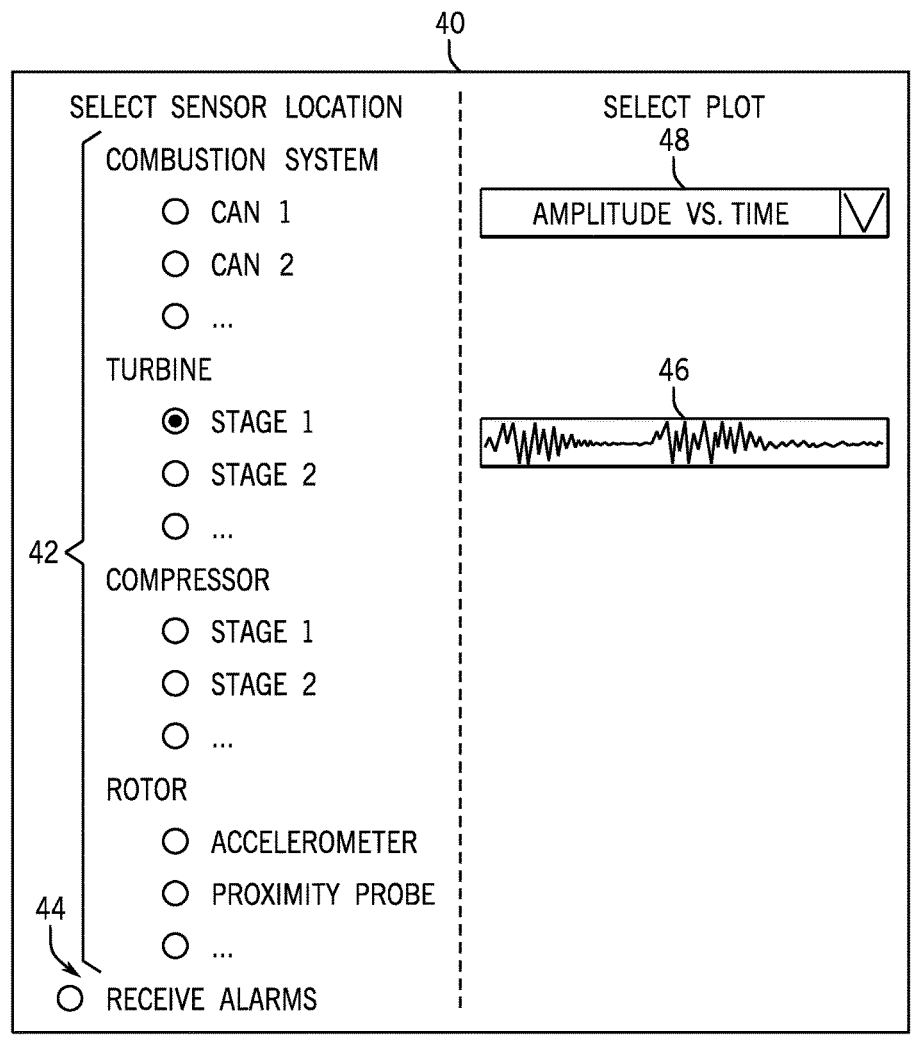
FIG. 3 is a screenshot of a graphical user interface for utilization in listening to audio output from the turbine system, in accordance with an embodiment.

FIG. 3 is a screenshot of a graphical user interface (GUI) 40 that displays a list 42 of sensor location(s) available for audio output and receives a user selection of which sensor location(s) for which to provide audio output, in accordance with an embodiment. Additionally, the GUI 40 displays an input selector 44 related to whether the user desires to receive control alarms related to the turbine system 10. As depicted, the list 42 includes radio button selectors for "CAN 1," "CAN 2," . . . of the combustion system 20, "STAGE 1," "STAGE 2," . . . of the turbine 12, "STAGE 1," "STAGE 2," . . . of the compressor 18, "ACCELEROMETER," and "PROXIMITY PROBE," . . . of the rotor. Thus, as may be appreciated, any number of sensors 22 may be used and selectable through the GUI 40. Although just one radio button is displayed for a particular blade stage of the turbine 12 and the compressor 18, it should be noted that there may be numerous sensors 22 located at each stage and additional radio buttons may be displayed as selectable to the user. It should be noted that a "select all" radio button selector may be included for each component of the turbine system 10. For example, a "select all" radio button selector may be included under each heading for the combustion system 20, the turbine 12, the compressor 18, the rotor, and so forth. In addition, a "select all" radio button selector may be displayed that enables listening to all of the sensors 22 included in the turbine system 10 at once.

Further, although radio button selectors are used in the list 42, it should be noted that any selection input element may be used such as a dropdown list, a checkbox, an input textbox, or the like. Additionally, in some embodiments, voice commands may be used to select the sensor location to listen to from the list 42. Thus, the controller 24 and/or the computing device 25 may include a microphone that is configured to receive sounds and the processor 28 and 29 may be configured to process the sounds to select the desired sensor location to listen to.

The user may use an input peripheral such as a mouse to move an arrow or hand selection icon around the GUI. When the user depresses and releases a button on the mouse and the selection icon is above a radio button selector, the radio button selector may toggle to a selected state if in a deselected state or may toggle to a deselected state if already in a selected state. Additionally, the input peripheral may include a touchscreen. When the user touches a portion of the touchscreen where a radio button selector is located, the radio button selector may toggle to a selected state if in a deselected state or may toggle to a deselected state if already in a selected state.

In some embodiments, the sensor locations 23 in the combustion system 20, the turbine 12, the compressor 18, and/or the rotor may be represented graphically, similar to FIG. 2, on the GUI 40. In this way, instead of, or in addition, to selecting the sensor locations from the list 42, the user may select a graphical representation of the sensor location on a visualization of the turbine system 10 to listen to audio output 34 from the areas of the turbine system 10 that include those particular sensors 22. Additionally, the user may select the sensor location to listen to from the list 42 and the graphical representation of the combustion system 20, the turbine 12, the compressor 18, and/or the rotor may be highlighted in the turbine system 10 displayed on the GUI 40. This may enable the user to visualize where each sensor 22 is physically located relative to one another in the turbine system 10.

When the user selects a particular sensor location to listen to, the GUI 40 may display a visualization 46 of a sound wave representative of the audio emitted from the respective location of the turbine system 10 as obtained by the sensor 22. Thus, the user may be able to visualize the sound wave on the GUI 40 via the visualization 46 that is being displayed by a display of the controller 24 and/or the computing device 25. In some embodiments, a respective visualization 46 may include a respective sound wave for the respective locations that are selected. Additionally or alternatively, one or more visualizations 46 may include numerous sound waves to be overlaid. That is, one visualization 46 may include depictions of multiple sound waves to enable the user to compare the sound waves relative to one another more clearly. It should be noted that the information displayed on the visualization 46 may be performed independently of the audio output 34. For example, the audio output 34 may emit combustion noises, while the visualization 46 displays sound waves overlaid for both combustion and a particular turbine stage.

Although the embodiment of the visualization 46 depicted is a time domain output (amplitude versus time), it should be should be appreciated that the visualization 46 may be a spectral output (frequency versus amplitude). A spectral output may enable a user to identify the frequency associated with any abnormality detected and may guide an action to be taken. Further, in some embodiments, the GUI 40 may provide an option to select/deselect the plots to be displayed. For example, a graphical selector element, such as dropdown list 48, may be used to enable the user to select whether to display the time domain outputs, spectral outputs, or both.

Further, the software application associated with the GUI may output a live feed of the audio for the selected sensor location to the respective audio output device 30 and/or 31 of the controller 24 and/or the computing device 25. Thus, in some embodiments the user may listen to the audio from the selected sensor location and/or view the sound wave associated with the audio of the selected sensor location. Using both the audio output 34 and the visual representation 46 in conjunction may enable the user to double check a determination of whether an anomaly, event, or problem is present. For example, the sound wave visualization 46 may be used to confirm that a loud or unexpected noise was detected by the sensors 22 during operation of the turbine system 10 and the noise was not due to some event near the operator using the computing device 25. That is, the audio output 34 and the sound wave visualization 46 may be used as a check on each other.

Using the list 42 on the GUI 40, the user may select the sensor location(s) to listen to. For example, the user may select to listen to just one sensor location, may select to listen to just a particular component (e.g., one or more stages of the compressor 18, the turbine 12, etc.), or may select to listen to all of the sensor locations at once. In this way, the user may detect whether an anomaly, event, or problem is present in the turbine system 10 in general or on an individual component basis by listening to audio output 34 representing the pressure or vibration within specific components during operation. As previously noted, the sensors 22 may emit signals during full-speed operation of the turbine system 10, any other stage of operation, or even when the turbine system 10 is shutdown. The audio output 34 may be provided in real-time or near real-time as operation (e.g., combustion) is occurring. Also, the audio output 34 may be provided via the controller 24 and/or the computing device 25, which may be physically located away from the actual turbine system 10 (e.g., in a control room or in a separate building).

Further, using the input selector 44 for control alarms, the GUI 40 may provide an input selection to the user to select whether to receive control alarms. Receiving information (e.g., type of alarm, status, parameters, timestamp) related to control alarms may be used in conjunction with the audio output 34 of the sensors 22 during operation of the turbine system 10 to perform diagnostics. For example, certain control alarms may relate to vibration above a threshold, oil pressure below a threshold, oil pressure above a threshold, bearing temperature above a threshold, cooling water failure, power failure, or the like. The user may view the control alarm that is currently activated and listen to the audio output 34 of the selected sensor location to determine that the irregular audio output 34 is caused by the event indicated by the control alarm. Likewise, when the user hears irregular audio output 34 from the sensor location during operation and the control alarms are not triggered or activated, then the user may determine that the control alarms need to be recalibrated or checked to make sure they are operating properly.

Figure 4:
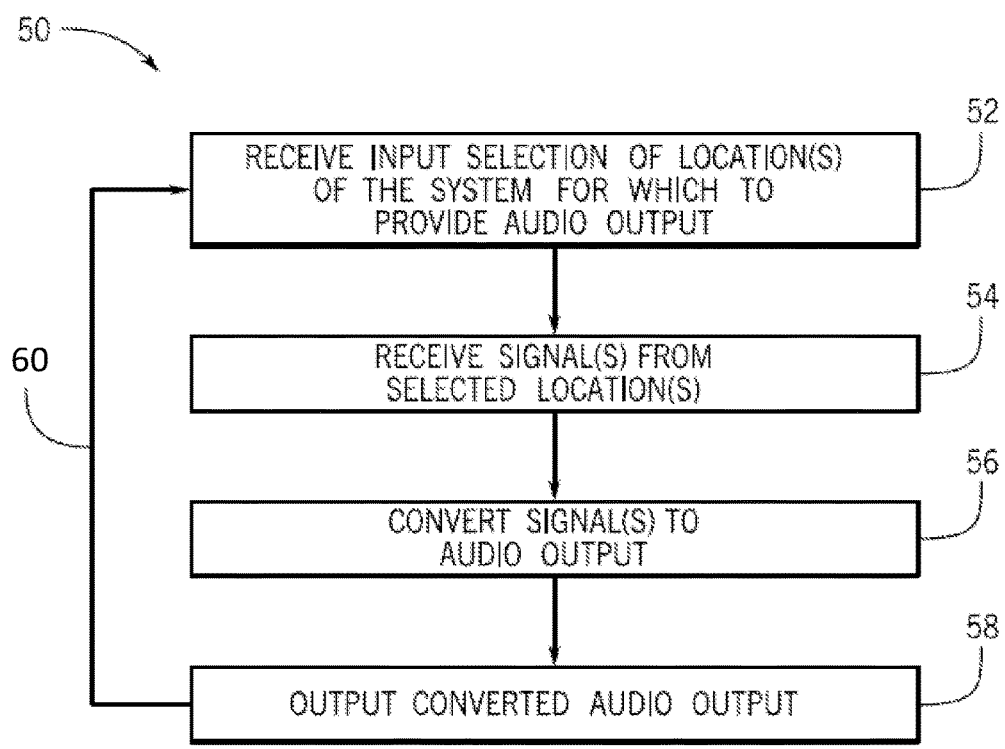
FIG. 4 is a flow chart illustrating an embodiment of a method for detecting anomalies, events, or problems via audio output, in accordance with an embodiment.

FIG. 4 is a flow chart illustrating an embodiment of a method 50 for detecting anomalies, events, or problems via audio output, in accordance with an embodiment. Although the following description of the method 50 is described with reference to the processor 28 of the controller 24, it should be noted that the method 50 may be performed by other processors disposed on other devices that may be capable of communicating with the sensors 22, such as the processor 29 of the computing device 25 or other components associated with the turbine system 10. Additionally, although the following method 50 describes a number of operations that may be performed, it should be noted that the method 50 may be performed in a variety of suitable orders and all of the operations may not be performed. It should be appreciated that the method 50 may be wholly executed by the controller 24 or the execution may be distributed between the controller 24 and the computing device 25. Further, the method 50 may be implemented as computer instructions included in a software application stored on the memory 26 or 27. As previously discussed, the software application may be obtainable from a software distribution platform.

Referring now to the method 50, the processor 28 may receive (block 52) an input selection of the sensor location for which to provide audio output 34. The input selection may be entered by a user using the GUI 40 described above. For example, the user may select the sensor location from the list 42. The user may select a subset of the sensor locations (one or more but not all), or all of the sensor locations. Based on the input selection, the processor 28 may cause a network interface to tune-in to the respective sensors 22 associated with the selected sensor location (e.g., compressor 18, inlet, turbine 12, combustion can 23, holes 34, borescope port 36, etc.). Additionally or alternatively, the network interface may already be communicatively coupled to the sensors 22 associated with the selected location.

The processor 28 may receive (block 54) the signals from the sensors 22 of the selected location. As previously described, each sensor 22 may include a combustion dynamic pressure sensor, probe, gage, accelerometer, or the like that senses pressure or vibration waves or signals in the particular location and emits the signal.

Once the signals are received, the processor 28 may convert (block 56) the signals to the audio output 34. In some embodiments, the processor 28 may perform additional processing or calculations on the signal during conversion prior to output of the audio output 34. For example, the processor 28 may perform A-weighting, B-weighting, C-weighting, D-weighting, reverse A-weighting, reverse B-weighting, reverse C-weighting, reverse D-weighting, or the like. It should be appreciated that any type of suitable frequency-dependent amplification or filtering may be performed by the processor 28. It should also be appreciated that the audio output 34 may include the converted signals from a subset of sensor locations (one or more but not all), or all of the sensor locations depending on the sensor locations selected by the user.

The processor 28 may output (block 58) the converted audio output 34 via the audio output device 30 or 31. The user may listen to the audio output 34 to detect whether there is an anomaly, event, or problem present in the selected location(s) of the sensor 22 or the turbine system 10 in general. That is, an irregular noise emitted from a particular sensor 22 during operation may be indicative of an issue with the component that the sensor 22 is attached to or with the turbine system 10 as a whole. Anomalies that may be detected may include flutter, rotating stall, whistling caused by resonance of the compressor bleed cavities and/or various cavities or wheel spaces in the turbine 12, and/or loose items (e.g., bolts, debris) inside of components of the turbine system 10.

If the user selected to listen to the audio from a single sensor location and determines that the audio output 34 is satisfactory (e.g., regular noise during operation), then the method 50 may be repeated, as shown by arrow 60, and the user may select the next sensor location to which to listen. The method 50 may be repeated until the user listens to all of the sensor locations in the turbine system 10 or until the user identifies an anomaly, event, or problem in the turbine system 10 and performs a preventative action, as described above.

Technical effects of the subject matter include detecting an anomaly, event, or problem in a turbine system 10 using audio output. The audio output 34 may be obtained via one or more sensors 22 in any desirable location of the turbine system 10. In some embodiments, the sensors 22 may already be installed in the turbine system 10, and thus, no additional instrumentation is installed to perform the disclosed techniques. Additionally, sensors 22 may be added to the turbine system 10 as desired (e.g., placed in holes of the casing). The sensors 22 may sense pressure or vibration waves. Further, the sensors 22 may emit the signals to the controller 24 and/or the computing device 25, which may execute a software application to convert the signals to the audio output 34 to emit via the audio output devices 30 and 31. In addition, some embodiments enable the user to select the sensor locations for which to provide the audio output 34 using a GUI 40. The GUI 40 may include a visualization of the components of the turbine system 10 and show where the sensors 22 are located on the visualization, among other things.

This written description uses examples to disclose the subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A turbine system comprising:
   a turbine system comprising an air inlet section, a compressor, a combustion system, and a turbine;
   a plurality of sensors, each of the plurality of sensors disposed in the air inlet section, the compressor, the combustion system, and the turbine of the turbine system; and
   a controller comprising:
      a memory storing one or more processor-executable routines; and
      a processor configured to access and execute the one or more routines encoded by the memory wherein the one or more routines, when executed, cause the processor to:
         receive one or more signals from one or more of the plurality of sensors during any stage of operation of the turbine system;
         convert the one or more signals to an audio output characterized by one or more sound waves; and
         emit the one or more sound waves of the converted audio output as an audible sound via one or more audio output devices; wherein the one or more sound waves emitted by one or more audio output devices audibly indicates of anomalies, events, or problems present in the respective location.

2. The turbine system of claim 1, wherein the plurality of sensors comprises one or more combustion dynamic pressure sensors, microphones, clearance probes, optical probes, accelerometers, strain gages, or some combination thereof.

3. The turbine system of claim 1, wherein the plurality of sensors is configured to sense pressure or vibration waves.

4. The turbine system of claim 1, wherein the one or more routines, when executed, cause the processor to receive an input selection from a graphical user interface (GUI) selecting one or more locations of the plurality of sensors for which to provide the audio output.

5. The turbine system of claim 4, wherein the input selection is received via a list that provides selection of a subset of the locations of the plurality of sensors or all of the locations of the plurality of sensors.

6. The turbine system of claim 4, wherein the GUI provides an input selector to receive control alarms related to the turbine system.

7. The turbine system of claim 4, wherein the GUI displays a visualization of the one or more sound waves representative of the audio output, based on the input selection of the respective one or more locations.

8. The turbine system of claim 1, wherein the respective location comprises an area external to the turbine system or a component internal to the turbine system, wherein the component comprises an inlet, a compressor, a combustion can, a combustion system, a turbine, a hole on a casing of the turbine system, or a boroscope port.

9. The turbine system of claim 1 wherein the anomalies, events, or problems comprise flutter, rotating stall, whistling caused by resonance of a compressor bleed cavity or cavities in a turbine, loose items in the location, or some combination thereof.

10. A controller, comprising:
    a memory storing one or more processor-executable routines; and
    a processor configured to access and execute the one or more routines encoded by the memory wherein the one or more routines, when executed cause the processor to:
       receive one or more signals from one or more of a plurality of sensors during any stage of operation of a turbine system, wherein each of the plurality of sensors is disposed in a respective location of the turbine system;
       convert the one or more signals to an audio output characterized by one or more sound waves; and
       emit the one or more sound waves of the converted audio output as an audible sound via one or more audio output devices; wherein the one or more sound waves emitted by one or more audio output devices audibly indicates of anomalies, events, or problems present in the respective location.

11. The controller of claim 10, wherein the one or more routines, when executed, cause the processor to receive an input selection from a list on a graphical user interface (GUI) selecting one or more locations of the plurality sensors for which to provide the audio output.

12. The controller of claim 11, wherein the input selection of the one or more locations of the plurality of sensors causes the one or more locations to be highlighted on a visualization of the turbine system displayed on the GUI.

13. The controller of claim 11, wherein the input selection of the one or more locations of the plurality of sensors causes a visualization of the one or more sound waves representative of the audio output to be displayed on the GUI for the respective one or more locations.

14. The controller of claim 10, wherein the anomalies, events, or problems present in the respective location comprise flutter, rotating stall, whistling caused by resonance of a compressor bleed cavity or cavities in a turbine, loose items in the location, or some combination thereof.

15. The controller of claim 10, wherein the plurality of sensors comprises combustion dynamic pressure sensors, clearance probes, optical probes, microphones, accelerometers, strain gages, or some combination thereof.

16. One or more tangible, non-transitory computer-readable mediums comprising instructions that, when executed by one or more processors, cause the one or more processors to:
    receive one or more signals from a plurality of sensors during any stage of operation of a turbine system, wherein each of the plurality of sensors is disposed at a respective location of the turbine system, and wherein the signals are indicative of dynamic pressure inside each respective location;
    convert the one or more signals to an audio output characterized by one or more sound waves; and
    emit the one or more sound waves of the converted audio output as an audible sound via one or more audio output devices; wherein the one or more sound waves emitted by one or more audio output devices audibly indicates of anomalies, events, or problems present in the respective location.

17. The one or more tangible, non-transitory computer-readable mediums of claim 16, wherein the instructions, when executed by the processor, cause the processor to receive an input selection from a graphical user interface (GUI) selecting one or more locations of the plurality of sensors for which to provide the audio output, and the input selection comprises a subset of the one or more locations of the plurality of sensors or all of the one or more locations of the plurality of sensors.

18. The one or more tangible, non-transitory computer-readable mediums of claim 16, wherein the one or more computer-readable mediums are included in a smartphone, a laptop, or a personal computer that is physically located remote from the turbine system.

* * * * *